United States Patent [19]

Baloga

[11] 4,427,451
[45] Jan. 24, 1984

[54] PREPARATION CONCENTRATED TIO₂ SLURRIES FROM SPENT STEAM

[75] Inventor: Michael R. Baloga, Big Sandy, Tenn.

[73] Assignee: E. I. De Pont de Nemours and Company, Wilmington, Del.

[21] Appl. No.: 303,044

[22] Filed: Sep. 17, 1981

[51] Int. Cl.³ .................................................. C09C 1/36
[52] U.S. Cl. .................................... 106/300; 106/309; 241/5; 241/21; 423/610
[58] Field of Search ..................... 106/300, 308 B, 309; 423/610; 241/5, 21

[56] References Cited

U.S. PATENT DOCUMENTS

| | | | |
|---|---|---|---|
| 3,622,084 | 11/1971 | Ross | 241/5 |
| 4,083,946 | 4/1978 | Schurr et al. | 423/610 |
| 4,170,485 | 10/1979 | Blake et al. | 106/300 |
| 4,227,935 | 10/1980 | Blake et al. | 106/308 B |

Primary Examiner—Helen M. McCarthy

[57] ABSTRACT

A process for preparing concentrated slurries of TiO₂ and water with a solids content of 30–70% by weight from TiO₂ micronizer tailings that are carried in steam separated from TiO₂ and steam from a micronizer by scrubbing the steam and TiO₂ micronizer tailings with a slurry of TiO₂ and water, separating TiO₂ and water from the steam and circulating a portion of the TiO₂ and water to the absorber until the solids content desired is reached.

6 Claims, 1 Drawing Figure

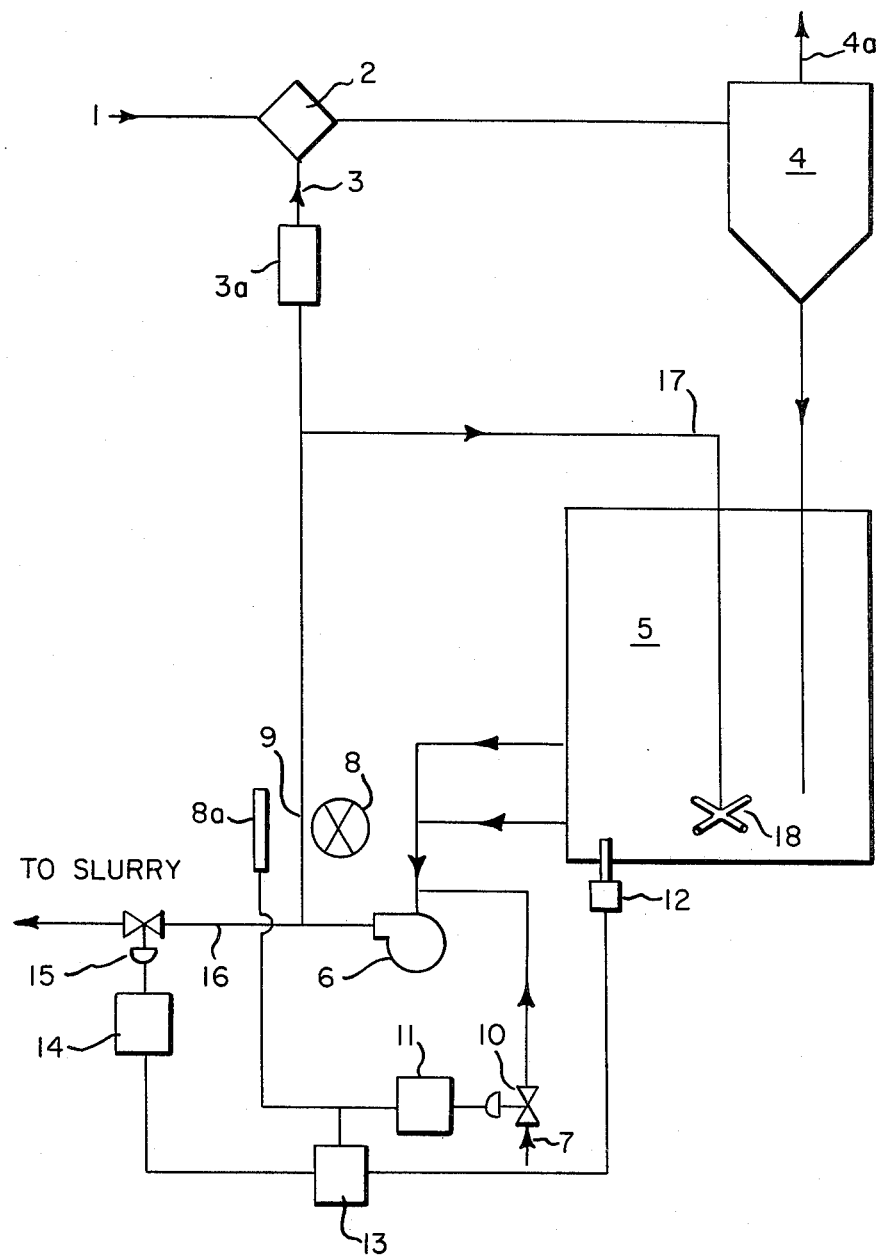

PREPARATION CONCENTRATED TiO$_2$ SLURRIES FROM SPENT STEAM

DESCRIPTION

1. Technical Field

This invention relates to a process for preparing concentrated slurries of TiO$_2$ and water from TiO$_2$ tailings in spent steam. More particularly, this invention relates to a process for preparing concentrated slurries of TiO$_2$ from TiO$_2$ tailings in spent steam by limiting the amount of water used to separate the TiO$_2$ from the spent steam.

2. Background Art

U.S. Pat. No. 4,227,935 discloses a method for making slurry from TiO$_2$ fines recovered from TiO$_2$ that was not micronized or fluid energy milled. The TiO$_2$ fines in slurry form are coated with aluminum oxide and concentrated either by filtration or rotary evaporator.

U.S. Pat. No. 4,170,485 discloses the preparation of high solid slurries of TiO$_2$ with increased gloss relative to conventional slurries. The TiO$_2$ fines from the fluid energy mill micronizer which is the bottom 10-20% of the product from the micronizer are trapped in water and allowed to stand. This TiO$_2$ in water is concentrated by filtering and/or adding dry TiO$_2$ to give the high solids slurry.

TiO$_2$ is generally produced by hydrolyzing an aqueous solution of titanium sulfate and calcining the hydrolyzate at 750°-1000° C. or oxidizing a titanium tetrachloride at elevated temperatures followed by cooling to temperatures below 600° C. The TiO$_2$ thus prepared is dry or wet ground and then dry milled. One method of dry milling is a fluid energy mill which can also be referred to as a micronizer. A fluid energy mill involves introducing dry TiO$_2$ pigment and a fluid, e.g., steam into the outer portion of an inwardly spiraling vortex so as to convey the TiO$_2$ at high velocity against the housing of the spiral vortex to fracture aggregates. The material exiting the fluid energy mill is separated as dry TiO$_2$ and steam containing TiO$_2$ tailings. TiO$_2$ tailings are TiO$_2$ that is carried out with the steam when separation is achieved. This steam with TiO$_2$ tailings is generally scrubbed with water to separate the steam and TiO$_2$. The TiO$_2$, after the water scrubbing, generally constitutes a slurry of about 1-10% total solids content.

This slurry can be treated in a variety of ways to recover the TiO$_2$ content. It can be reground with regular production or it may be concentrated to form high solid slurries or added in limited quantities to high solids aqueous TiO$_2$ slurries. Such TiO$_2$ slurries are usually marketed as slurries for the production of coated papers and water based paints.

In any facility built for the preparation of dry TiO$_2$ it would require the use of extremely large quantities of high solid slurries to dispose of the dilute TiO$_2$ tailings slurries that are recoverable from fluid energy mills. If added to regular dry TiO$_2$ production, the energy required to refilter, redry and regrind such tailings would significantly add to the cost of the product. Additional filtration capacity would also be required. If one were to simply concentrate the TiO$_2$ tailing slurries by evaporation or other conventional methods, the energy demands required would be substantial.

DISCLOSURE OF THE INVENTION

Now a process has been discovered that permits the concentration of TiO$_2$ tailing slurries more efficiently than conventional processes. Accordingly, a process has been found for preparing a concentrated slurry of titanium dioxide in water from titanium dioxide tailings from a titanium dioxide finishing treatment process which comprises (a) passing spent steam from a TiO$_2$ micronizer unavoidably carrying with it TiO$_2$ into a scrubber where it is contacted with an aqueous slurry of TiO$_2$;

(b) separating the TiO$_2$ and water from the steam;

(c) collecting the separated TiO$_2$ and water in a vessel;

(d) pumping a part of the TiO$_2$ and water from the vessel as an aqueous slurry to the scrubber with additional water;

(e) continuing the above treatment until the total solids content of the TiO$_2$ and water slurry from the vessel is 30-70% by weight, preferably 50-70% and most preferably 50-65%.

The TiO$_2$ pigment that is present in the spent steam which is the starting material in the present process can be obtained by the combustion of titaniferous salts from the chloride process such as titanium tetrachloride or by hydrolyzing, filtering, washing and calcining a soluble titanium salt from the sulfate process.

The crude TiO$_2$ pigment obtained from either the chloride process or the sulfate process is cooled to a temperature ranging from 300°-800° C., e.g., by procedures disclosed in U.S. Pat. Nos. 2,833,637 and 2,721,626. Separation of the cooled gaseous products from the TiO$_2$ phase can be by recourse to suitable gravitational means, such as centrifugal or cyclone separation or by filtration or by electrostatic, ultrasonic and other means.

The separated TiO$_2$ pigment fraction from either the chloride or sulfate process is slurried in water, and hydrous oxides of silica and/or alumina are applied by procedures disclosed in the art. Examples of such prior art describing how the addition of the silica and/or alumina is made, U.S. Pat. Nos. Re 27,818 and 4,125,412, are incorporated by reference. However, the TiO$_2$ source for the present process may be TiO$_2$ without silica and/or alumina.

Soluble salts are removed from the treated slurry through a filtration/washing procedure in order to reduce the concentration of aqueous leachable salts to conform to the American Society for Testing Materials specifications for pigment resistance, ASTMD476.

The washed filter cake is dewatered on a vacuum rotary drum filter in order to reduce its water content and thereby minimize energy consumption when the filter cake is dried. Depending upon the hydrous oxide treatment levels, the water content of the filter cake before drying will typically range between 30 and 70% pigment solids content by weight.

After the drying step, the pigment is subjected to a final dry milling operation in a fluid energy mill which can also be referred to as a micronizer.

The fluid energy milling involves the introduction of dry TiO$_2$ pigment into the grinding chamber of the micronizer where superheated steam accelerates the pigment aggregates to a high velocity in a spiralling vortex within the micronizer chamber. The grinding action occurs when the pigment aggregates collide with each other and with the walls of the grinding chamber. The mixture of steam and ground pigment that leaves the fluid energy mill is routed through a cyclone classifier which separates about 95% of the pigment stream from the spent micronizer steam. The spent steam and the remaining unseparated TiO$_2$ (about 5%) is then treated according to the invention. This remaining TiO$_2$ is referred to herein also as micronizer tailings.

The process of the invention can be further described by reference to the FIGURE which is a schematic drawing that illustrates the present invention. Referring niow to the FIGURE, the micronizer tailings stream 1 is scrubbed with a recirculating stream of a slurry of the micronizer tailings that pass through rotameter 3A. The TiO$_2$ slurry becomes concentrated in TiO$_2$ within the scrubber unit 2 and the enriched TiO$_2$ slurry is then separated from the uncondensed steam in the wet cyclone 4. The spent steam exits the wet cyclone 4 via 4A. The condensed TiO$_2$ slurry is collected in a catch tank vessel 5 and recirculated by means of a high capacity pump 6 back to the wet scrubber 2 for additional concentrating.

The specific gravity of the tailings stream is regulated by the addition of water 7 to the suction side of the high capacity recirculating pump 6, the rate of water addition being regulated by a nuclear density measuring device that operates from radiation source 8 across the flow in line 9 to the radiation gauge 8a. The concentration of TiO$_2$ solids is directly related to the optical density of the nuclear radiation that is transmitted across the optical slurry pathway 9 by the equation:

$$\text{Optical Density} = \ln(I/I_o) = e^{-kCl}$$

where $I_o$ is the radiation intensity of the nuclear source, I is the intensity of the radiation after it is attenuated by the slurry stream, k is an attenuation coefficient that is a unique property of the absorbing medium, C is concentration of the TiO$_2$ in the slurry stream and l is the thickness of the optical pathway. The notation ln refers to the natural logarithm and e refers to the natural exponential base 2.718. A change in the concentration of TiO$_2$ in the slurry stream will cause a proportional change in the optical density that is perceived by the detector portion of the nuclear density device, and this signal is converted to pressure in pressure/current converter 11 to throttle the control valve 10 that admits fresh water to the suction side of the pump. A set point for automatic control of the system will be dependent upon the pumping characteristics of the concentrated TiO$_2$ tailings slurry. This set point will correspond to a slurry concentration that is generally less than 70% solids. The volume of tailings that must be disposed of will define the lower limit of concentration, usually 30%, that is economical to dispose of into the slurry product stream.

The level in the catch tank is automatically controlled by measuring the hydrostatic pressure of the slurry in the tank 5 with probe 12 and by electronically dividing this pressure measurement by the optical density signal that is a measure of specific gravity at electrical divider 13. The mathematical equivalent to this ratio of pressure and density measures is a third variable that is proportional to a density corrected level in the tank. The absolute level in the tank is regulated by this signal which is converted to pressure in the pressure/current converter 14 which only controls valve 15 in the export line 16 that carries the concentrated TiO$_2$ tailings slurry to the finished product slurry manufacturing process.

Finally in the FIGURE, a recirculating stream of TiO$_2$ slurry 17 is continuously routed back to the catch tank through a jet mixer 18 to provide vigorous agitation to prevent settling in the tank.

The water addition to the suction side of the pump is preferred. However, water can be added at various other points in the described process including addition to the scrubber directly and addition to the slurry before it reaches the absorber.

The invention is further illustrated in the examples that follow:

EXAMPLES

Example 1

TiO$_2$ prepared by the chloride process was slurried in water and oxides of silicon and aluminum deposited on the TiO$_2$ in the amount of 8% by weight oxide of silicon and 8% by weight oxide of aluminum based on the TiO$_2$. After removal of soluble salts by filtration and washing, the filter cake was dewatered and dried. The dried TiO$_2$ pigment was milled in a fluid energy mill. The TiO$_2$ pigment from a fluid energy mill was sent to a cyclone classifier where spent steam that carries with it unseparated TiO$_2$ was separated from TiO$_2$.

This unseparated TiO$_2$ was processed in the system described in the drawing in the present specification except that initially water was fed directly to the absorber at a rate of 5.5 gpm without any slurry of micronizer tailings going to the scrubber. The concentration of the tailings leaving the wet cyclone was 149 grams per liter. After 1 hour of operation, the water to the scrubber was gradually reduced from 5.5 gpm to 2.0 gpm over a period of 5 hours and a slurry of TiO$_2$ tailings from the catch tank were also routed to the scrubber at 20 gpm. The slurry of TiO$_2$ tailings gradually increased to a concentration of 30% by weight solids. The table below summarizes the water and tailing flows.

| Time | Fresh Water Flow to Scrubber gpm | Tailings Flow to Scrubber gpm | Pigment Concentration | |
|---|---|---|---|---|
| | | | Expected Wt % | Measured Wt % |
| 0 | 5.5 | 0 | Base Cond | 13.4 |
| 60 min | 5.5 | 20.0 | Base Cond | 11.9 |
| 75 min | 5.0 | 20.0 | 14.2 | 13.9 |
| 90 min | 4.5 | 20.0 | 15.6 | 15.7 |
| 120 min | 3.5 | 20.0 | 19.3 | 19.3 |
| 180 min | 3.0 | 20.0 | 22.0 | 21.8 |
| 240 min | 2.5 | 20.0 | 25.6 | 22.4 |
| 300 min | 2.0 | 20.0 | 30.5 | 29.6 |
| 360 min | 2.0 | 20.0 | 30.5 | 30.7 |

The 30% TiO$_2$ slurry was added to TiO$_2$ pigment in place of water to prepare a slurry of TiO$_2$ of 64.5% solids that is a normal commercial production item. The surfactants normally added to the commercial product were added with the TiO$_2$ tailings slurry.

A comparison was made of the slurry properties of normally prepared 64.5% solids TiO$_2$ slurries and 64.5% solids slurry was made with TiO$_2$ tailings slurries to illustrate a use for the micronizer tailings.

| | Conventional 64.5% Solids TiO$_2$ | Tailings 64.5% Solids TiO$_2$ |
|---|---|---|
| Percent Solids | 64.5 | 64.8 |
| pH | 8.2 | 8.2 |
| Viscosity (cps) | | |
| Brookfield @ 100 rpm | 105 | 115 |
| Brookfield @ 10 rpm | 130 | 140 |
| Density (lbs/gal) | 15.8 | 15.9 |

The 64.5% solids slurries of TiO$_2$ from both the conventional slurry and the tailings slurry were used to prepare paint. The paint with the micronizer tailings exhibited a small hiding power and tinting strength advantage over the paint with the conventional slurry.

EXAMPLE 2

The procedure of Example 1 was followed except that the starting TiO$_2$ was coated with 1.5% by weight of an oxide of silicon and 4% by weight of an oxide of aluminum based on the TiO$_2$. The concentration of tailings from the wet cyclone when only water was being fed to the scrubber at 6 gpm was 101 g/l or 9.3% by weight solids. The slurry of tailings from the catch tank was then sent to the scrubber at 20 gpm and the fresh water rate reduced to 0.75 gpm. In a period of 4 hours, the concentration of TiO$_2$ tailings in the catch tank gradually increased to 844 g/l or 51.3% by weight solids.

The tailings slurry was then used to manufacture a commercial product slurry of 76% solids that is normally made from the TiO$_2$ from which the starting material of this example came from by adding to such TiO$_2$ the tailings slurry rather than water. A comparison was made of the slurry prepared conventionally and the slurry from the tailings slurry of the present example.

|  | Conventional 76% Solids TiO$_2$ | Tailings 76% Solids TiO$_2$ |
| --- | --- | --- |
| Percent Solids | 76.2 | 76.2 |
| pH | 9.7 | 9.7 |
| Viscosity (cps) |  |  |
| Brookfield @ 100 rpm | 168 | 189 |
| Brookfield @ 10 rpm | 550 | 700 |
| Density (lbs/gal) | 19.16 | 19.23 |

It may be necessary to add surfactants to the catch tank to reduce the viscosity of the TiO$_2$ slurry especially at solids levels near 70%.

INDUSTRIAL APPLICABILITY

The process of the present invention is industrially applicable to any TiO$_2$ producing facility. It would permit a more efficient preparation of TiO$_2$ slurry. The process of the invention can be achieved quite rapidly relative to conventional concentration and inherently thereby provides many advantages in process capacity.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

I claim:

1. A process for preparing a concentrated slurry of titanium dioxide in water from titanium dioxide tailings from a titanium dioxide fluid energy steam milling micronizer process which comprises
   (a) passing spent steam from a TiO$_2$ micronizer unavoidably carrying with it TiO$_2$ into a scrubber where it is contacted with a recirculating stream of an aqueous slurry of the micronizer tailings of TiO$_2$;
   (b) separating the TiO$_2$ and water from the steam;
   (c) collecting the separated TiO$_2$ and water in a vessel in which settling is prevented;
   (d) pumping a part of the TiO$_2$ and water from the vessel as an aqueous slurry to the scrubber with additional water;
   (e) continuing the above treatment until the total solids content of the TiO$_2$ and water slurry from the vessel is 30–70% by weight.

2. The process of claim 1 wherein the total solids content of the TiO$_2$ and water is 50–70% by weight.

3. The process of claim 1 wherein the total solids content of the TiO$_2$ and water is 50–65%.

4. The process of claim 1 wherein the additional water is added directly to the scrubber.

5. The process of claim 1 wherein the additional water is added to the slurry after leaving the vessel and before the scrubber.

6. The process of claim 1 wherein the additional water is introduced between the vessel and the pump.

* * * * *